United States Patent [19]
Harms et al.

[11] Patent Number: 5,196,119
[45] Date of Patent: Mar. 23, 1993

[54] FILTERING SYSTEM UTILIZING ROTATIONAL FLOW AND DUAL CHAMBERS

[75] Inventors: Harold H. Harms, Palm Beach Gardens, Fla.; Edmund B. Bourgeois, Warren, Mich.

[73] Assignee: Harmsco, Inc., Riviera Beach, Fla.

[21] Appl. No.: 543,326

[22] Filed: Jun. 25, 1990

[51] Int. Cl.$^5$ .................................. B01D 27/08
[52] U.S. Cl. ............................ 210/438; 210/445; 210/453; 210/456
[58] Field of Search ............ 210/438, 445, 453, 456

[56] References Cited

U.S. PATENT DOCUMENTS

| | | | |
|---|---|---|---|
| 2,173,631 | 9/1939 | Nieders | 210/438 |
| 2,197,252 | 4/1940 | Decker | 210/438 |
| 2,576,144 | 11/1951 | Rood | 210/453 |
| 3,154,487 | 10/1964 | Thornton et al. | 210/438 |
| 3,289,608 | 12/1966 | Laval, Jr. | |
| 3,512,651 | 5/1970 | Laval, Jr. | |
| 3,568,837 | 3/1971 | Laval, Jr. | |
| 3,701,425 | 10/1972 | Laval, Jr. | |
| 3,720,322 | 3/1973 | Harms | |
| 3,947,364 | 3/1976 | Laval, Jr. | |
| 3,963,073 | 6/1976 | Laval, Jr. | |
| 4,072,481 | 2/1978 | Laval, Jr. | |
| 4,108,775 | 8/1978 | Wilkes et al. | 210/453 |
| 4,120,795 | 10/1978 | Laval, Jr. | |
| 4,140,638 | 2/1979 | Laval, Jr. | |
| 4,147,630 | 4/1979 | Laval, Jr. | |
| 4,148,735 | 4/1979 | Laval, Jr. | |
| 4,561,979 | 12/1985 | Harms et al. | |

OTHER PUBLICATIONS

Nussbaum Advertisement-Nov., 1980.

Primary Examiner—Robert A. Dawson
Assistant Examiner—W. L. Millard
Attorney, Agent, or Firm—Quarles & Brady

[57] ABSTRACT

A filtering system comprises an outer housing into which fluid enters tangentially through a side inlet port to create rotational flow therein. Solid contaminants which clog filtering media are precipitated to the bottom of housing through action of centrifugal force in rotational flow. An inner can, disposed within the housing shrouds a filter cartridge. Unfiltered fluid flows rotationally into the inner can and is filtered through a vertical cylindrical filter cartridge. Filtered fluid flows up through the center of said cartridge to a clean fluid chamber below a domed cover and exists downwardly through a vertical outlet tube extending through the filter cartridge to an outlet port in the bottom of the housing. Gases in the system are collected in the clean fluid chamber and transported by the fluid flow through the outlet tube, thereby automatically purging gases from the filtering system.

10 Claims, 2 Drawing Sheets

FILTERING SYSTEM UTILIZING ROTATIONAL FLOW AND DUAL CHAMBERS

FIELD OF THE INVENTION

The present invention relates generally to filtering systems for filtering fluids in domestic and industrial applications and, more particularly, to filtering systems using an upflow filtering design to automatically purge gases. Rotational flow is used to separate solid contaminants and maximize filter media surface area.

BACKGROUND OF THE INVENTION

This invention is an improvement of Applicant's single cartridge filter as disclosed in U.S. Pat. No. 4,561,979, issued Dec. 31, 1985, which is incorporated by reference herein. The improvements and benefits derived from this invention are best understood in relation to this single cartridge filtering system.

The single cartridge filtering system comprises a housing having a removable domed cover and a horizontal partition in the housing to form separate filtered and unfiltered liquid chambers. A large vertical cylindrical pleated filter cartridge is suspended from the lower side of the partition in the unfiltered liquid chamber of the housing.

The filter cartridge has a central perforated tube which fits over and is radially spaced from a vertical outlet tube. The outlet tube extends out from the bottom of the housing to an aperture in the partition. This partition aperture forms an annular opening for allowing passage of filtered liquid from the interior of the filter cartridge into the clean liquid chamber in the domed cover. The lower end of the filter cartridge seals to a threaded male adapter around the bottom of the outlet tube. An annular pleated filter sleeve surrounds the perforated tube.

In the single cartridge filtering system, the liquid to be filtered enters the housing below the partition. After passing through the filter media and the perforated tube, the filtered liquid travels upwardly around the outside of the outlet tube into the clean liquid chamber and then down through the outlet tube.

The structure of the single cartridge filter system causes gases in the filtered liquid to accumulate in the clean liquid chamber below the domed cover. The flow of filtered liquid into the domed area and down the outlet tube displaces the collected gases, forcing the gases down the outlet tube. This automatic removal of the gases results in an increased efficiency of the filtering system by preventing accumulated gases from occupying a large volume of the filter region. Additionally, the single cartridge filtering system provides a means for easy removal of the filtering cartridge.

Although the single cartridge filter system provides means for improved filtration efficiency over other filtering systems, the single cartridge filter system does not prevent two causes of decreased filtration efficiency.

The first cause of decreased filtration efficiency in the single cartridge filtering system results from a reduction of filter media surface area, referred to as blinding off. The filtering media of the single cartridge comprises an annular sleeve of filtering material, such as paper, which is pleated to provide a maximized amount of surface area for filtering. During the filtering process, the force imparted on the filtering media by the fluid flow causes several of the pleats to be compressed together, thereby reducing the total effective surface area for filtering. One method for reducing this blinding off is to provide reinforcement rings circumferentially along the length of the filtering media. However, these reinforcement rings do not completely prevent the blinding out of the pleated media. Another cause of reduction in filtration efficiency is the clogging of the filtration media by particles which are transported into the system by the fluid to be filtered.

OBJECTS OF THE INVENTION

It is an object of the invention to provide a filtering system which is easy to maintain and provides a high degree of filtration efficiency.

It is another object of the invention to provide a filtering system which automatically purges gases in the filtered fluid from the system.

It is still another object of the invention to provide a filtering system which utilizes an upflow design filter cartridge to increase filtration efficiency.

It is a further object of this invention to provide a filtering system which utilizes rotational flow to reduce flow velocity and provide uniform fluid distribution around a filter cartridge, preventing the compression of filtering pleats and thereby providing increased filtration efficiency.

It is a still further object of the invention to provide a filtering system which utilizes rotational flow to separate large particles which may clog the filtering media, allowing these particles to collect at the bottom of the filter housing.

SUMMARY OF THE INVENTION

The liquid filter of the present invention generally comprises an outer housing, an inner can, a filter cartridge, a domed cover and a partition plate. The outer housing is a vertical cylindrical vessel having a closed bottom and an open top. Unfiltered fluid is introduced into the outer housing through a tangential inlet port located approximately half-way along the height of the outer housing. Filtered fluid exits the system through an outlet port located in the bottom of the outer housing. A threaded outlet port extension or nipple is mounted to the inner surface of the housing bottom. Additionally, the outer housing provides a drain port in the closed bottom.

The inner can is disposed within the housing and has an open top, a closed bottom and a generally cylindrical shape. The bottom of the inner can provides a central aperture which sealingly engages an outlet tube coupler. The bottom end of the coupler threads onto the outlet port extension, thereby suspending the can bottom above the housing bottom. The top of the can is disposed below the open top of the outer housing, providing a passage for fluid from the outer housing into the inner can. A vertical outlet tube threads into the top end of the coupler and extends to the open top of the housing.

A filter cartridge is disposed within the can around the outlet tube. This filter cartridge comprises a perforated tube surrounded by an annular pleated filter media. The perforated tube is radially spaced around the outlet tube, thereby creating an annular channel for the flow of filtered fluids.

A dome-shaped cover mounts to the open top of the housing. A partition plate mounts to the open top of the housing and divides the inner volume of the filtering system into a filtered fluid chamber and an unfiltered fluid chamber. The volume below the partition plate which corresponds to the volume of the housing comprises the unfiltered fluid chamber while the volume above the partition plate beneath the cover serves as the filtered fluid chamber.

During operation of the filtering system, unfiltered fluid enters the outer housing through the tangential inlet port. The unfiltered fluid in the outer housing flows into the inner can through its top open surface where the fluid comes in contact with the filter cartridge. The fluid is filtered through the filtering media and flows through the perforated tube to the annular channel outside the outlet tube. This filtered fluid travels up the annular channel to the clean liquid chamber above the partition. In the clean liquid chamber, the fluid flow transitions and travels downwardly through the outlet tube to exit the filtering system.

As part of the filtering process, solid particles in the unfiltered fluid are removed from the fluid flow prior to introduction of the unfiltered fluid to the filter cartridge. Solid particles in the unfiltered fluid, such as rust flakes, gravel and natural debris, can clog the filtering media, thereby reducing filtration efficiency and requiring frequent filter cleaning. To remove these particles from the fluid flow, the unfiltered fluid is first induced into rotational flow by the tangential entrance and the circular inner surface of the cylindrical housing. Centrifugal forces created by the rotational flow cause the solid particles to circulate against the inner surface of the housing.

While circulating against this inner surface, most of the solid particles are forced downward by gravity and collect in the bottom of the housing for subsequent drainage. Solid particles of sufficient weight and density are drawn downward by gravity despite the upward flow of the fluid. In the event that some of the solid particles flow upwardly to the top of the inner housing, a deflector lip is provided on the upper edge of the inner housing to deflect the particles downwardly, increasing the likelihood of their precipitation to the bottom of the housing.

Another significant feature of the present invention is the use of rotational flow and the inner can to maximize the effective surface area of the filter media. As fluid flows from the narrow annular channel in the outer housing into the relatively large open top of the inner can, the flow velocity is substantially reduced from the inlet velocity. Additionally, because the fluid in the outer housing enters the top of the inner can under rotational flow, this rotational flow continues within the inner housing.

The reduced velocity and rotational flow of the fluid in the inner can prevents forces on the pleats of the filter media which cause the pleats to press together or blind off. The reduced velocity insures a uniform distribution of fluid flow into the filtering media while the rotational flow imparts tangential forces on the filter pleats, keeping the pleats separated. This separation of pleats and uniform distribution of fluid maintains a maximum surface area for filtration.

The filtering system also provides means for automatically purging gases in the system. In prior art systems, gases trapped in the filter housing reduce the efficiency of the filtering system and create a danger of explosion due to the explosive nature of compressed gas. However, because of the upflow design of the filter, gases in the fluid travel upwardly and are collected in the domed cover region rather than remaining trapped in the unfiltered fluid chamber. Upon passing through the clean liquid chamber, the filtered fluid displaces the accumulated gases in the clean fluid chamber, transporting these gases out of the system through the outlet tube.

In order to allow occasional drainage of the inner can, a plurality of drainage parts are provided in the bottom of the inner can. These drainage parts are formed to also allow particles in the inner can to exit during operation while inhibiting collected particles at the bottom of the outer housing from entering the inner can through the parts.

BRIEF DESCRIPTION OF THE DRAWINGS

The features, objects and advantages of the present invention are more clearly understood by reference to the accompanying drawings, in which.

DETAILED DESCRIPTION OF THE PREFERRED EMBODIMENT

A. Structure of the Filtering System

Figure 1:
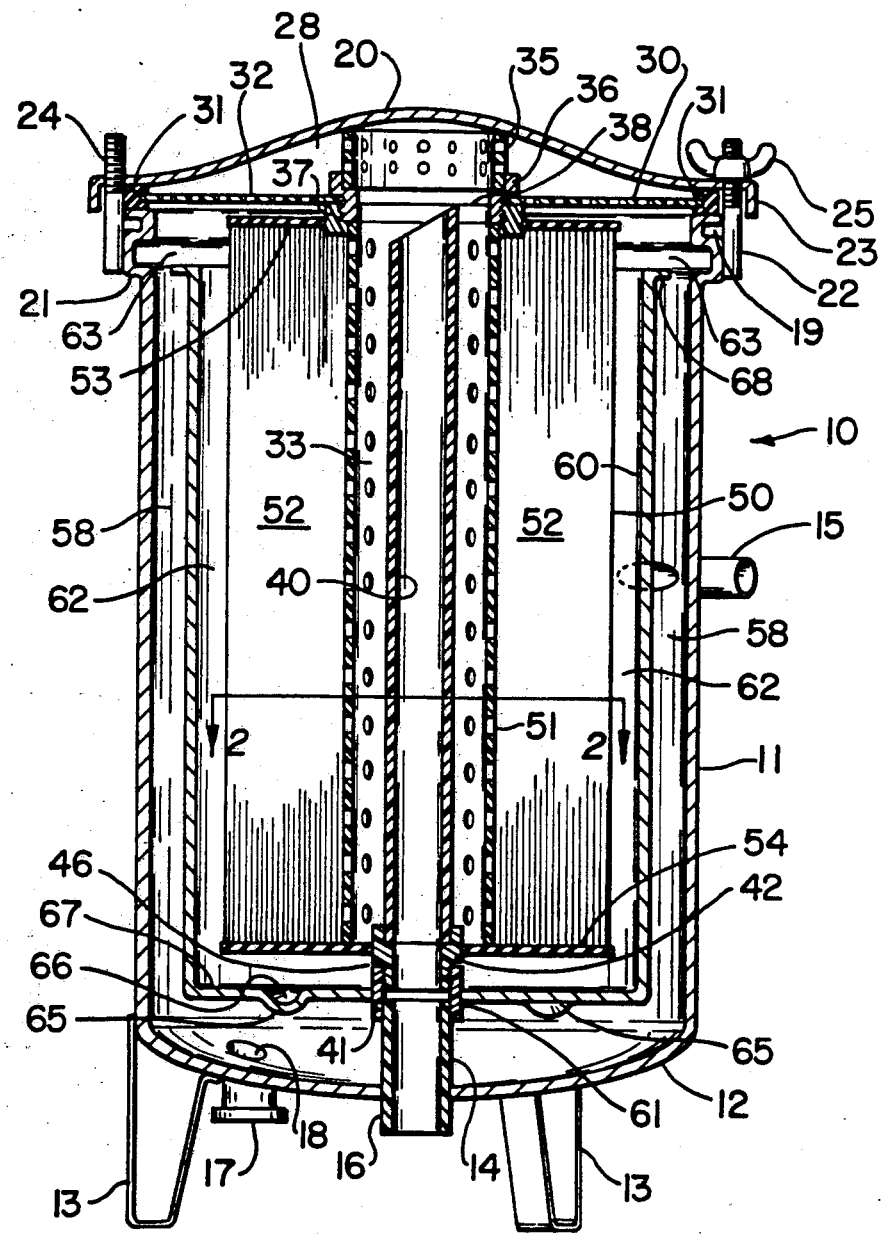
FIG. 1 is a vertical sectional view of an embodiment of the filtering system.

Referring to FIG. 1, the filtering system 10 of this invention comprises an open top, vertical, cylindrical chamber or housing 11 whose closed bottom 12 may be supported by at least three equally spaced legs 13 to provide room for easy connection to the outlet port 16 and the drainage port 18. These ports 16 and 18 are preferably hermetically joined such as by welding to the bottom 12 of the housing 11 and may have their outer ends threaded for connection to pipes. The top of the housing 11 may provide, adjacent the rim 19, an outwardly extending circumferential rib 21 to which are welded a plurality of equally angularly spaced upwardly extending threaded studs 22.

The open top of the housing 11 is closed by a domed cover 20. The cover 20 has an outwardly extending peripheral flange 23 with apertures 24 which align with the threaded studs 22. Wing nuts 25 may thread onto the studs 22 to clamp the cover 20 onto the housing 11.

A vertical outlet tube 40 provides a threaded male adapter 42 which threads into a coupler 41. The bottom end of the coupler 41 threads onto a vertical extension or nipple 14 of the outlet port 16. The outlet tube 40 extends upwardly to the center of the aperture 32 in the partition 30. The coupler 41 may be sealed to the male adapter 42 and extension 14 by threads or a suitable adhesive.

A flexible partition plate 30 is clamped between the periphery of the cover 20 and the upper rim 19 of the housing 11. A gasket 31, seals the edge of the cover 20 to the upper rim 19 of the housing 11 as well as the partition 30. Accordingly, two separate chambers 28 and 58 inside the domed cover 20 and the housing 11, respectively, are formed. The flexible partition plate 30 is provided with an aperture 32 vertically aligned with the outlet port 16. Because the diameter of the outlet tube 40 is smaller than the diameter of the aperture 32, an annular opening 38 is formed for the free flow of filtered liquid into the clean liquid chamber 28.

A retainer nut 36 threads into an aperture adapter 37, thereby suspending the filter cartridge 50 from the partition plate 30. A perforated, annular spacer 35 is mounted to the top of the retainer nut 36. This spacer 35 limits the upward flexing of the partition plate 30 while allowing the flow of fluid through the perforations.

The single filter column or cartridge 50 comprises a central perforated tube 51 disposed around and radially spaced from the outlet tube 40. The radial spacing, which is vertically aligned with the annular spacing 38, creates a passage 33 for filtered liquid and gases from the perforated tube 51 to the annular spacing 38. Surrounding the perforated tube 51 is pleated fabric or fibrous filter media 52. Top and bottom plastic annular discs 53 and 54 seal the ends of the perforated tube 51 and filter media 52.

The coupler 41 receives at its upper end the male adapter 42 of the outlet tube 40. The bottom end of the coupler 41 threads onto the outlet extension or nipple 14. The bottom annular disc 54 seals around the male adapter 42.

The inner chamber or can 60 is a vertical cylindrical vessel having an open top and a closed bottom. The inner can 60 is disposed around the filter cartridge 50 and provides an aperture 61 in its bottom to engage the coupler 41. The inner can 60 has a diameter larger than the outer diameter of the filter cartridge 50 so as to provide an annular passage 62 for unfiltered fluids inside the can 60. The inner can 60 is of such a height that its upper top is disposed below the partition plate 30. Thus, a passage 63 for fluid is provided between the volume of the outer housing 11 into the volume of the inner can 60.

B. Flow Path During Operation

During the filtering operation, unfiltered fluid is introduced into the outer housing through the tangential inlet port 15. The tangential inlet port 15 is disposed along the vertical height of the outer housing 11 approximately halfway along the height of the outer housing 11. Unfiltered fluid enters the inner can 60 through passage 63 and contacts the filter cartridge 50. The fluid is filtered through filter media 52 and exits through the perforated tube 51 to the annular passage 33.

Filtered fluid in the passage 33 flows upwardly through the aperture 32 to the clean liquid or top chamber 28. In the chamber 28, the fluid flow transitions from a generally upward flow to a generally downward flow and travels down the outlet tube 40 to exit the filtering system 10 through outlet port 16.

C. Filtering of Solid Particles

Unfiltered fluid entering the filtering system 10 often carries solid particles. These particles may clog the filtering media 52 and thereby reduce the filtration efficiency of the system 10.

To prevent the particles from contacting the filter media 52, the particles are removed from the flow utilizing gravity and rotational flow. Because of the tangential configuration of the inlet port 15, the entering fluid is induced into rotational flow within the unfiltered fluid chamber 58. Centrifugal forces created by the rotational flow push solid particles in the unfiltered fluid to the circumferential inner surface of the outer housing 11. Large particles fall under the force of gravity to the bottom 12 of the outer housing 11.

In one embodiment of the invention, the collected particles may be drained manually through the drain port 18. In this embodiment, a drain cap 17 may be provided. Alternatively, the drain port 18 can be connected to a second filtering system, not shown.

Additionally, the inner can 60 provides a peripheral lip 68 on the rim of its open top. This lip 68 deflects large particles which may rise in the outer housing to the top of the inner can 60 outwardly where the large particles eventually fall to the bottom 12 of the housing 11.

D. Preventing Compression of Filter Pleats

As the fluid flows from the outer housing through passage 63 to the open top of the inner can 60, the cross sectional area of fluid flow is increased, resulting in a substantial reduction in flow velocity. Moreover, because the fluid in the outer housing 11 enters the inner can 60 under rotational flow, rotational flow is induced in the inner can 60.

Figure 2:
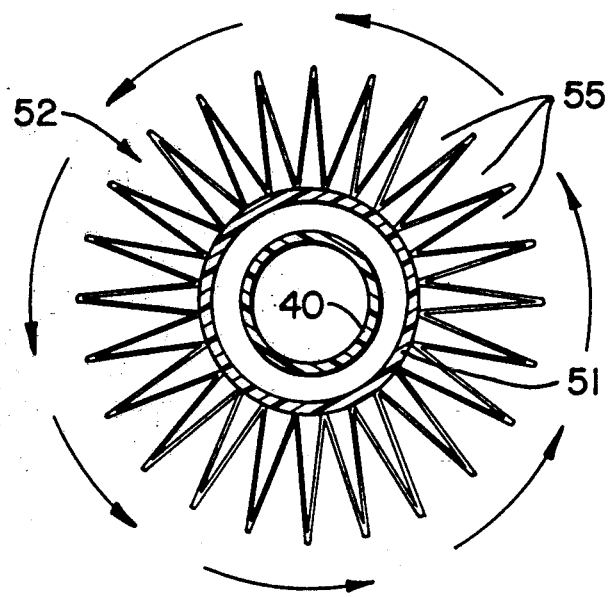
FIG. 2 is a cutaway view of the filter cartridge, taken along line II—II, showing the interaction of the rotational flow with the pleats of the filter sleeve.

The reduced velocity of the fluid flow provides a uniform distribution of fluid around the filter cartridge 50 while minimizing forces which tend to press the pleats 55 together and reduce the effective filtration surface area. Referring to FIG. 2, the rotational flow of the unfiltered fluid in contact with the filtering media 52 creates a tangential force on the pleats 55 of the filtering media 52. This tangential force causes the pleats 55 of the filtering sleeve 52 to remain separated. Because the tangential forces created by the rotational flow maintain separation of the pleats 55 in the filtering sleeve 52, the surface area of filtering sleeve 52 is maximized. The prevention of the blinding off of the pleats 55 in the filtering sleeve 52 can greatly increase filtration efficiency.

E. Clam-Shell Apertures

During periodic drainage and cleaning of the filter 10, means for draining fluid from the inner can 60 are needed. However, during operation, these drain ports 65 must prevent the passage of solid particles at the bottom of the housing 11 from entering the inner can 60.

Figure 3:
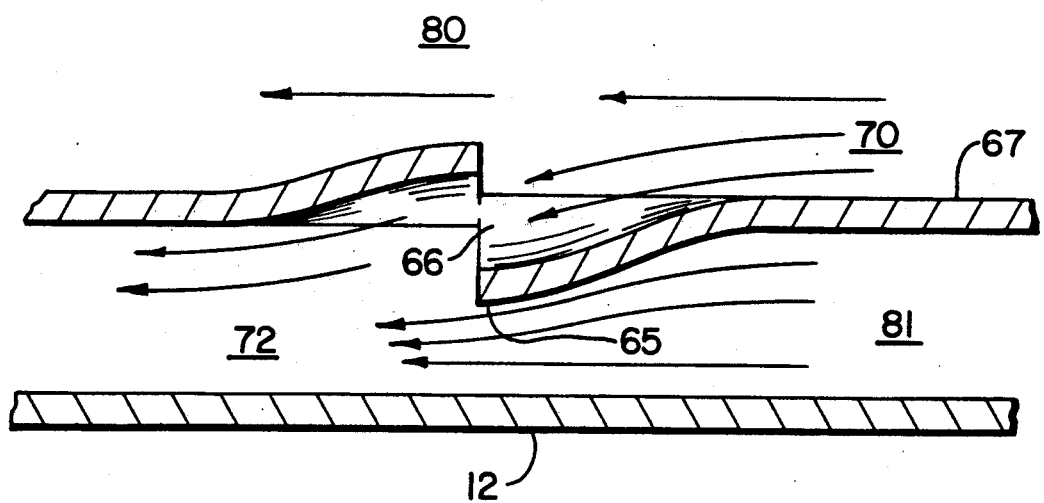
FIG. 3 is a cutaway, side view of one of the clamshell drainage ports in the bottom surface of the inner can with arrows indicating fluid flow.

Referring to FIGS. 1 and 3, clam-shell apertures 65 cooperate with the rotational flow to induce unidirectional flow out of the inner can 60. To form each clam-shell aperture 65, a hole 66 is provided in the bottom 67 of the inner can 60. Viewed from the direction of rotational flow 70 inside the inner can volume 80, the inner can bottom 67 curves downwardly prior to the hole 66. On the opposite side of the hole 66, the can bottom 67 curves upwardly. The upward and downward curves deflect the flow 70 along the inner can bottom 67 and divert the flow 70 out to the outer housing volume 81.

Fluid and particle flow 72 in the outer housing volume 81 are deflected away from the hole 66 by the downwardly extending curve of the clam-shell aperture 65. In order for fluid flow 72 in the outer housing volume 81 to enter hole 66, a substantial flow reversal would have to occur. Because this tortuous reversal is unlikely, flow 72 in the outer housing volume 81 is greatly inhibited from entering the inner can volume 80.

Accordingly, large particles and fluid within the outer housing volume 81 are not likely to flow into the inner can volume 80 through the clam shell apertures 65. However, fluid and particles in the inner can volume 80 can easily flow into the outer housing volume 81. This unidirectional flow serves as an additional filtering mechanism for those large particles which are able to enter the inner can 60 at the top.

This description of the preferred embodiment sets out the principles of this invention in connection with specific apparatus. It is intended as an example of one embodiment and not as a limitation to the scope of this invention.

We claim:

1. A filtering system, comprising:
   a cylindrical outer chamber having an inlet port for receiving fluid into the outer chamber;
   means for inducing unidirectional rotational flow about a central axis of the outer chamber;
   an inner can disposed within said outer chamber and having an opening at its top for receiving fluid from said outer chamber;
   a filter cartridge, having a hollow central portion, disposed in said inner can, whereby fluid in said inner can flows into said filter cartridge towards said hollow portion; and
   an outlet chamber providing an aperture engaging said hollow portion of said filter cartridge, whereby fluid flows into said outlet chamber, said outlet chamber extending through an orifice in a surface of the inner can and through a hole in the surface in said outer chamber and providing an outlet through which fluid in said outlet chamber exits.

2. A filter according to claim 1 further comprising a top chamber disposed above said outer chamber wherein fluid from said hollow portion flows upwardly into said top chamber through said top opening in said inner can and a top opening in said outer chamber.

3. A filter according to claim 2, in which the fluid in said top chamber exits through said outlet downwardly.

4. A filter according to claim 1, in which the inlet is positioned approximately half-way the axial height of said vertical cylindrical vessel.

5. A filter according to claim 1, in which an upper edge of said inner can, adjacent said open top, is formed to provide an outwardly extending peripheral lip for deflecting solid particles in said fluid away from said open top of said inner can.

6. A filter according to claim 1, in which a bottom surface of said inner can provides clam-shell apertures, whereby fluid in said inner can can flow through said apertures to said outer chamber but fluid in said outer chamber is subjected to a tortuous path to enter inner can through said apertures.

7. A filter according to claim 1, in which said inner can is constructed to maintain the fluid flow rotational.

8. A filter comprising:
   A. a vertical, cylindrical outer housing having a closed bottom, an open top, and a middle position along its vertical length, said outer housing having:
   (1) a tangential fluid inlet port at said middle position,
   (2) a drain port in said closed bottom,
   (3) an outlet port in said closed bottom,
   (4) fastening means around said open top,
   (5) an internal vertical outlet tube extending from said outlet port to above said open top, and
   (6) a sealing surface near the lower end of said outlet tube;
   B. a vertical, cylindrical inner housing having a closed bottom and open top, said inner housing being disposed in said outer housing around said outlet tube with said inner housing bottom being elevated above said outer housing bottom and providing a sealed aperture for receiving said outlet tube and with said inner housing open top being disposed below said outer housing open top;
   C. a domed cover for said outer housing having means cooperating with said fastening means to attach said cover to said outer housing;
   D. a partition clampable between a top edge of said outer housing and an peripheral edge of said cover, said partition having:
   (1) an annular resilient seal for sealing said partition, said cover, and said outer housing together, and
   (2) spacer means attached to a top surface of said partition and engageable against the inner surface of said cover, said partition providing an aperture to which said outlet tube extends and which aperture is spaced from said outlet tube to provide an annular opening in said partition;
   (3) annular plastic end discs, one of said end discs sealingly engaging a lower end of said outlet tube and the other end disc sealingly engaging the bottom surface of said partition,
   whereby a fluid to be filtered enters the outer housing tangentially through the inlet port under sufficient pressure to create rotational flow in said outer housing and said inner housing;
   whereby said rotational flow causes large particles in said fluid to be centrifugally forced to the inner vertical surface of the outer housing whereby the large particles fall to the bottom of the outer housing;
   whereby said fluid flows into the inner housing through the inner housing open top, into the annular opening into the inner volume of the cover, and down the vertical outlet tube to the outlet of the outer housing.

9. A filter according to claim 8 in which the inner housing provides an outwardly extending peripheral lip along its open top for deflecting large particles outwardly to fall to the bottom of the outer housing.

10. A filter according to claim 8, in which the closed bottom of the inner housing provided clam shell apertures for draining said inner housing, said clam shell apertures being disposed to prevent fluid flow from the outer housing through the inner housing bottom but allowing fluid flow out of the inner housing through the inner housing bottom.

* * * * *